Figure 3:
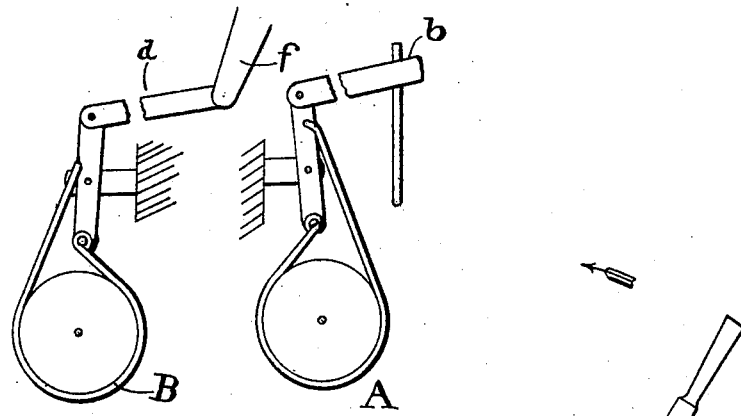

W. G. WILSON.
CONTROL OF TRANSMISSION MECHANISM FOR HEAVY MECHANICALLY PROPELLED VEHICLES.
APPLICATION FILED JULY 8, 1919.

1,324,757.
Patented Dec. 9, 1919.
2 SHEETS—SHEET 1.

INVENTOR
W. G. Wilson,
BY
L. R. Kerslake
ATTORNEY

W. G. WILSON.
CONTROL OF TRANSMISSION MECHANISM FOR HEAVY MECHANICALLY PROPELLED VEHICLES.
APPLICATION FILED JULY 8, 1919.

1,324,757.

Patented Dec. 9, 1919.
2 SHEETS—SHEET 2.

INVENTOR
W. G. Wilson,
BY H. R. Kerslake
ATTORNEY

UNITED STATES PATENT OFFICE.

WALTER GORDON WILSON, OF CHARTON, FARNINGHAM, ENGLAND.

CONTROL OF TRANSMISSION MECHANISM FOR HEAVY MECHANICALLY-PROPELLED VEHICLES.

1,324,757.      Specification of Letters Patent.      Patented Dec. 9, 1919.

Application filed July 8, 1919. Serial No. 309,527.

*To all whom it may concern:*

Be it known that I, WALTER GORDON WILSON, a subject of the King of Great Britain and Ireland, and residing at Charton, Farningham, in the county of Kent, England, have invented certain new and useful Improvements Relating to the Control of Transmission Mechanism for Heavy Mechanically-Propelled Vehicles, of which the following is a specification.

Some forms of transmission mechanism for heavy mechanically propelled vehicles involve the use of a pair of brakes or clutches one of which may be actuated by a hand lever, and the other by a pedal. For example, in a certain type of epicyclic transmission mechanism, for vehicles which are steered by differential driving, one brake which may be termed the reaction brake is provided for controlling the motion of an element of the mechanism, and another brake which may be termed the stopping brake is used for arresting the motion of the vehicle. The former may be actuated by hand and the other by foot. The stopping brake ordinarily requires for its operation a greater effort than the reaction brake. If the movement necessary between the band and drum of the stopping brake is made small a large mechanical advantage can be arranged for in the pedal, and the effort required to actuate the same can be made relatively small. In this case, however, a small derangement in the adjustment of the brake may interfere with the proper action of the brake. Thus the coacting parts may remain in engagement when they ought to be clear. On the other hand if ample freedom of movement is provided between the coacting parts, the mechanical advantage which can be provided in the pedal may be seriously diminished.

The object of the present invention is to enable the necessary amplitude of movement in a brake or clutch to be combined with any required mechanical advantage in the operating lever in a mechanism in which two or more control levers are provided; for this purpose the invention comprises the inter-connection of the levers in such a manner that when one is moved in the direction for putting its brake or clutch out of action it also produces a partial application of another brake or clutch, the operation of the latter being completed by another lever.

In the accompanying sheet of explanatory drawings:—

Figure 1:
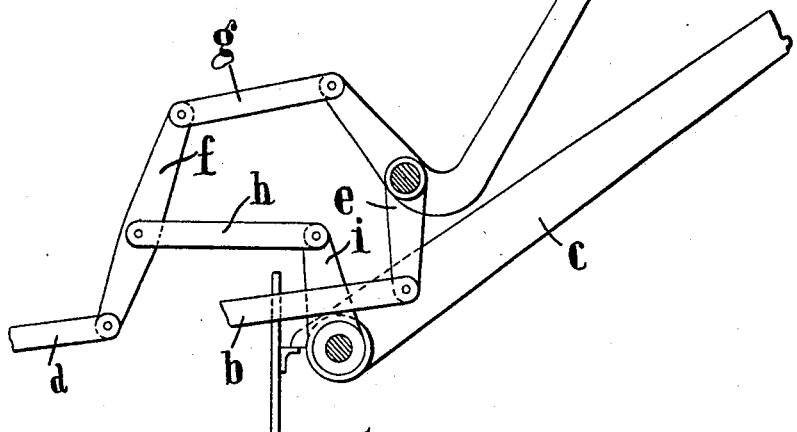
Figure 4:
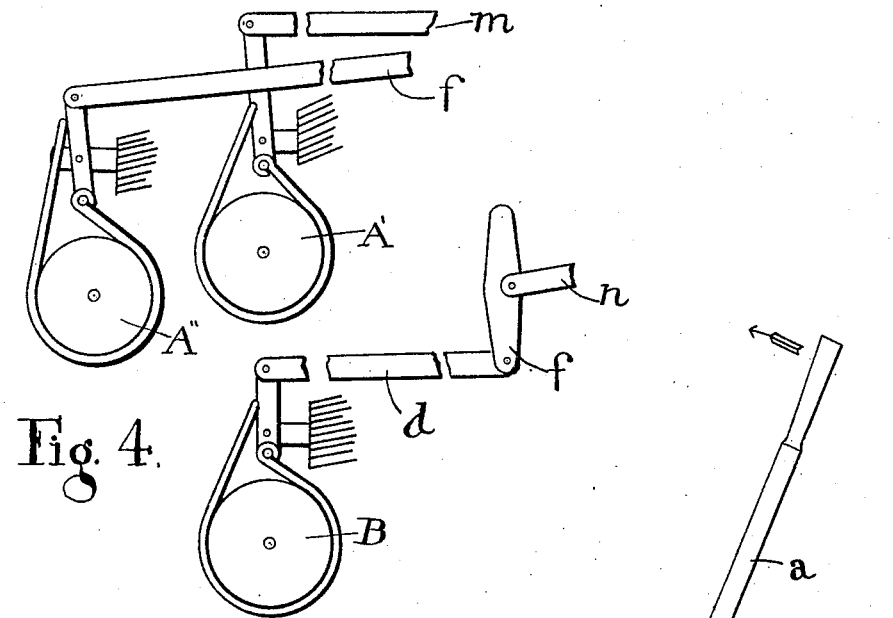
Figure 2:
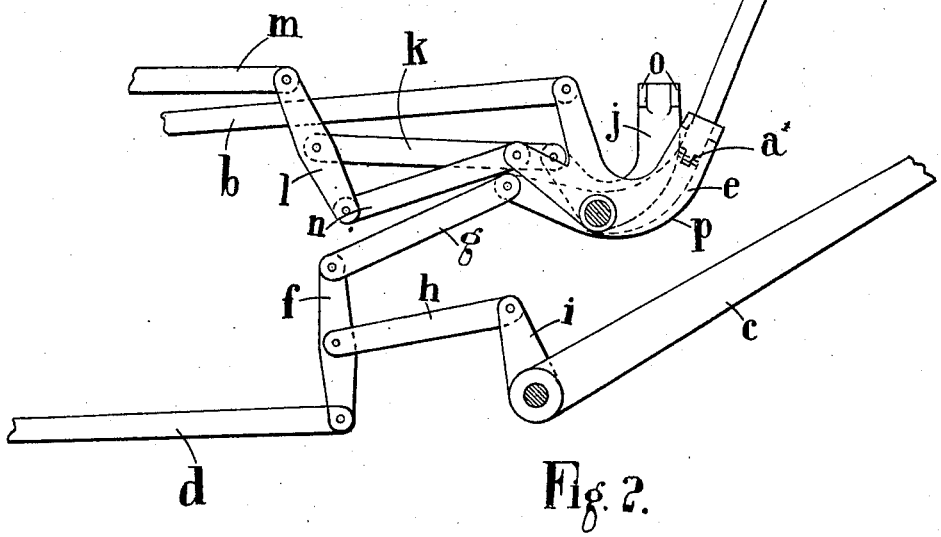

The figures illustrate diagrammatically two systems of brake operating levers arranged in accordance with this invention, Figures 1 and 3 showing a system in which two brakes are controlled and Figs. 2 and 4 a system in which three brakes are controlled.

In carrying the invention into effect as shown in Figs. 1 and 3 the mechanism to be controlled comprises a reaction brake A and a stopping brake B; the former is actuated by a hand lever $a$ through a link $b$ and the latter by a pedal lever $c$ through another link $d$. Actually the lever $a$ acts on the link $b$ through another lever $e$ secured to $a$. Virtually $a$ and $e$ are one lever. The connection of the stopping brake link $d$ is not made directly on to the pedal lever $c$ but through a lever $f$ which is connected to both the reaction brake lever $a$ (through a link $g$) and the pedal lever $c$ (through a link $h$ and lever $i$) and is capable of independent movement by either the hand or the pedal lever. The levers $c$ and $i$ are secured together and are practically one. It will be understood that the levers $a$ and $c$ are pivoted on fixed fulcra, but the lever $f$ is a floating lever. When moved in the direction of the arrow the lever $a$ is pushed up to a stop. The link $g$ is then in line with the fulcrum of the lever $a$ and pressure applied to the lever $c$ has in consequence no returning effect on the lever $a$.

The disposition or arrangement of the parts is such that when the reaction brake is moved to the "off" position (by movement of the hand lever in the direction of the arrow) there is also imparted movement to the stopping brake mechanism which is utilized in taking up the idle motion of the said mechanism. The proper application of the stopping brake can then be effected by depression of the pedal lever. With such an arrangement a large mechanical advantage can be provided in the stopping brake mechanism with ample clearance between the band of the brake and its drum when the latter are free. Any interference with the original adjustment of the mechanism due to distortion in service or wear is therefore not likely to interfere with the working of the brake.

The arrangement shown in Figs. 2 and 4 is adapted for use with two re-action brakes A', A'' and a stopping brake B', the former being applied by hand and the latter by foot. The parts $a$, $c$, $d$, $f$, $g$, $h$, and $i$, comprising the pedal mechanism and its connection with the hand lever are similar to the parts similarly designated in Fig. 1. On one side of the hand lever $a$ is freely and coaxially pivoted a lever $p$ connected to the re-action brake link $b$. On the opposite side of the hand lever is another freely and coaxially pivoted lever $j$. The latter is connected by a link $k$ to a floating lever $l$ which in turn is connected to a link $m$ for operating the other re-action brake and by a link $n$ to a branch of the lever $l$. The lever $a$ is jointed at $a^1$ so that the upper part can be moved laterally by the operative into engagement with projections $o$ on the adjacent faces of the levers $p$ and $j$. The lever $a$ is shown in engagement with the lever $p$ and the disposition of the various parts is such that the brake controlled by the link $b$ is on, while the brakes controlled by the links $d$ and $m$ are both off. By moving the hand lever in the direction of the arrow the link $b$ is operated for releasing its brake. Simultaneously the slack is taken out of the other re-action brake and the stopping brake. If desired the stopping brake can now be applied by operation of the pedal, or the hand lever can be moved into engagement with the lever $j$, when a reverse movement of the hand lever causes the other re-action brake to be applied.

The movements of the levers $a$, $j$, $p$ in the direction of the arrow are limited by stops. In the limit of movement the links $g$ and $n$ are in line with the fulcrum of the said levers, and in consequence operation of the levers $c$ and $j$ have no returning effect on the levers $a$ or $p$. With the levers in the position shown movement of $a$ in the direction of the arrow has no effect on $j$ as the latter is held against its stop by the pull of the link $k$.

The invention is applicable to a variety of vehicle transmission mechanisms in which the problem above described occurs and by appropriate modification of details can be applied to the actuation of clutches instead of brakes.

Having now described my invention, what I claim as new and desire to secure by Letters Patent is:—

1. Speed controlling mechanism for heavy mechanically propelled road vehicles, comprising in combination controlling levers, brake operating connections extending from each lever and interconnections between the levers such that when one operating lever is moved to take its brake out of action the movement produces the partial application of another brake, the full operation of the latter being completed by the second operating lever.

2. Speed controlling mechanism for heavy mechanically propelled road vehicles, comprising in combination a pair of controlling levers, brake operating connections extending from each lever, interconnections between the two levers such that when one operating lever is moved to take its brake out of action the movement produces the partial application of the other brake, and means whereby the full operation of the latter brake is completed by the second operating brake.

3. Speed controlling mechanism for heavy mechanically propelled road vehicles, comprising in combination a pair of controlling levers, a brake operating connection extending from one of said levers and a clutch operating connection extending from the other lever, connections between the two levers such that when one lever is moved to take its clutch out of action the movement produces the partial application of the brake, and means whereby the full operation of the brake is completed by the second operating lever.

4. Speed controlling mechanism for heavy mechanically propelled road vehicles, comprising in combination brake operating connections, a pair of operating levers and interconnections between the two levers whereby a preliminary adjustment of the brake is effected by one lever but positively applied by the other lever.

5. Speed controlling mechanism for heavy mechanically propelled road vehicles, comprising the combination of a pair of brake operating links, a pair of operating levers, a float lever and a pair of links connecting one of the said brake operating links to both of the said operating levers, the other brake operating link being connected directly to one of the operating levers for the purpose described.

6. Speed controlling mechanism for heavy mechanically propelled road vehicles, comprising the combination of three brake operating links, four operating levers, a float lever and a pair of links connecting one of the operating links to one pair of operating levers, another floating lever and pair of links connecting another operating link to the other pair of operating levers, the third operating link being directly connected to one of the latter levers and means for connecting one of the operating levers in the first mentioned pair to either of the second pair.

7. Speed controlling mechanism for heavy mechanically propelled road vehicles, comprising in combination a hand operated controlling lever and a foot operated controlling lever, brake operating connections extending from each lever, interconnecting means between the two levers such that when the hand operated lever is moved to take its brake out of action the movement produces the partial application of the other brake and means whereby the full operation of the latter brake is completed by the foot operated lever.

8. Speed controlling mechanism for heavy mechanically propelled road vehicles, comprising in combination brake operating connections, a hand lever for actuating such connections, a foot operated lever, means whereby the latter lever is adapted to be controlled by the action of the hand operated brake, and means whereby the hand operated lever controls the operation of the foot operated brake.

In testimony whereof I have signed my name to this specification.

WALTER GORDON WILSON.